United States Patent Office 2,874,415
Patented Feb. 24, 1959

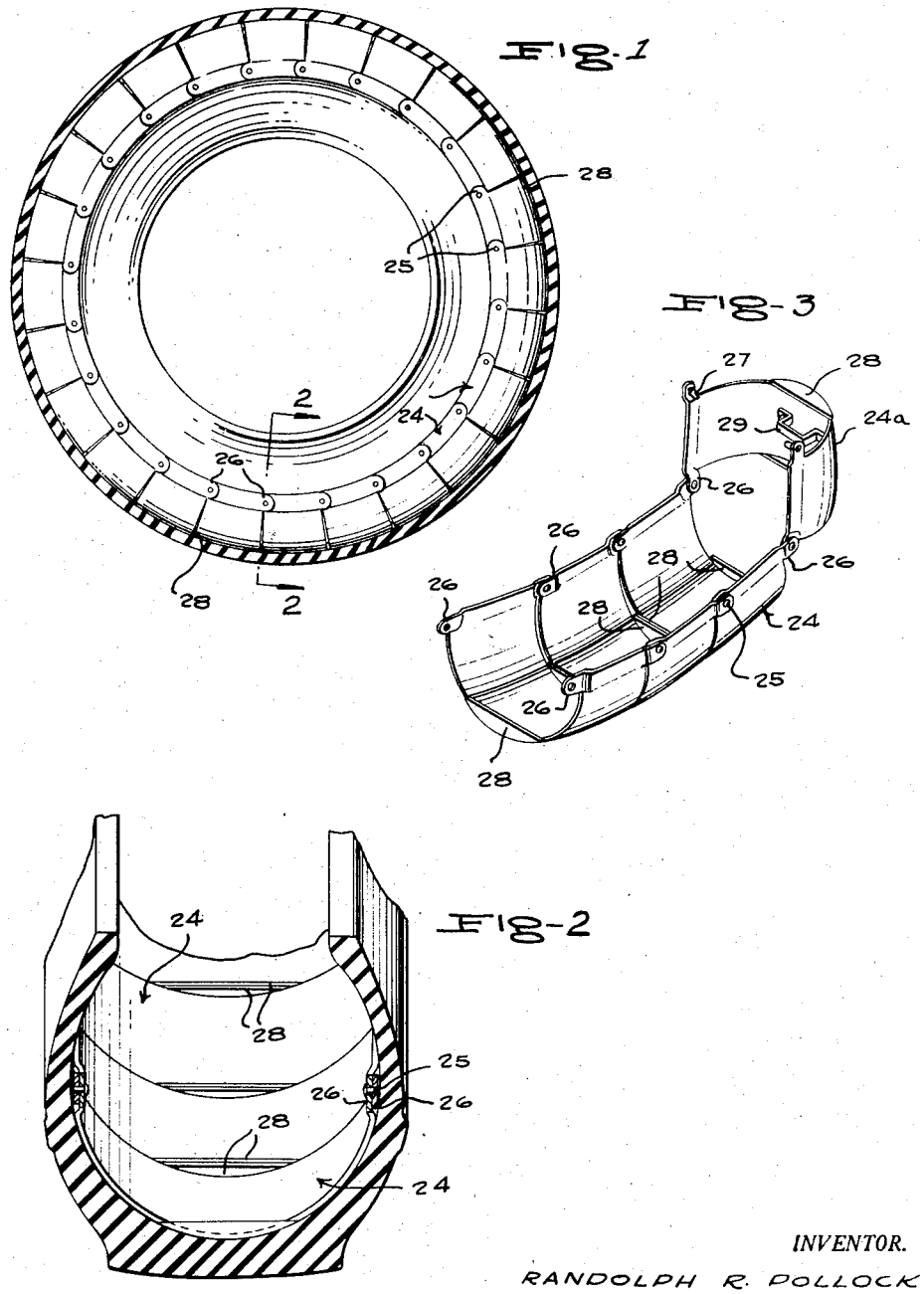

2,874,415
PRESSURE SEAL FOR VULCANIZING PNEUMATIC TIRES

Randolph R. Pollock, Lawrenceburg, Tenn.

Application March 20, 1956, Serial No. 572,743

2 Claims. (Cl. 18—45)

This invention relates to metallic pressure seals for use in vulcanizing pneumatic tires, and it consists in the constructions, arrangements and combinations herein described and claimed.

It has been found that there is a need for expanding a tire in a mold prior to inflation of the tire in the mold, since some tires are undersize and when the mold is closed and compressed, the fabric of the tire is of necessity stretched in order for the tire to fill the mold, presenting a condition which gives rise to many failures, in that air is forced through the tire structure forming a blister under the back edge of the tire.

It is therefore the cardinal object of the invention to provide an expander for use in a tire which will provide a positive sealing at the camel back edge, both inside and outside of the tire when the mold halves have been brought into operative engagement upon a tire, and prior to inflation of the tire.

It is also an object of the invention to provide a hingedly connected segmental metal jacket adapted to be positioned within a tire which when expanded will maintain the tire to full height and proper width within a mold section.

Additional objects, advantages and features of invention will be apparent from the following description considered in conjunction with the accompanying drawings, wherein, Figure 1 is a sectional view of a tire having the expander within the tire.

Figure 2 is a cross section on the line 2—2 of Figure 1, and

Figure 3 is a perspective view of a portion of the expander.

As shown in Figures 1 to 3, the sealing ring comprises a series of metallic sections 24 hingedly connected together by rivets 25. The sections are of identical construction and are formed from sheet steel in hollow convex formation of a cross sectional diameter so as to seat firmly against the inside of a tire beyond the camel back edge when fully expanded therewithin. As clearly shown in Figure 3, each section 24 is provided at the ends thereof with a pair of opposed offset ears 26 adapted to engage ears of the next adjacent section 24, the ears being apertured to receive the rivets 25. In order that the sealing ring may be expanded within a tire as well as removed therefrom, the ears of section 24a are provided with projecting pins 27 which engage apertures in the ears of an abutting section of the ring, and further, the section 24a may include a handle 29 permitting ready separation of the section 24a from the next adjacent section.

In order to reinforce the convex portion of the sealing ring, each section 24 and 24a is provided with a flange 28 extending transversely of the section and when the sealing ring is in expanded position, the flanges will be in snug contacting relation.

While I have shown and described preferred forms of the sealing ring, this is by way of illustration only, and I consider as my own all such modifications in construction as fairly fall within the scope of the appended claims.

I claim:

1. A sealing ring for use in vulcanizing pneumatic tires comprising hingedly connected concave metallic sections shaped to conform to the interior surface of the tire, one of said sections being detachably connected to a next adjacent section permitting ready insertion and removal from the tire, the overall dimensions of the expanded sealing ring being such as to expand the tire and form an air-tight seal at the camel back edge of the tire, each concave metallic section being formed with a flange transversely of respective ends thereof for snug abutting relation when expanded within the tire.

2. The structure of claim 1 wherein said detachable section is provided with a handle permitting ready separation from the next adjacent section.

References Cited in the file of this patent

UNITED STATES PATENTS

| | | |
|---|---|---|
| 1,214,277 | Cobb | Jan. 30, 1917 |
| 1,283,998 | Wattleworth | Nov. 5, 1918 |
| 1,381,316 | Lerch | June 14, 1921 |
| 2,411,558 | Semler | Nov. 26, 1946 |
| 2,451,992 | Grotenhuis | Oct. 19, 1948 |